June 16, 1925.
L. F. JORDAN
MOTOR VEHICLE
Filed June 7, 1921
1,541,965
2 Sheets-Sheet 1
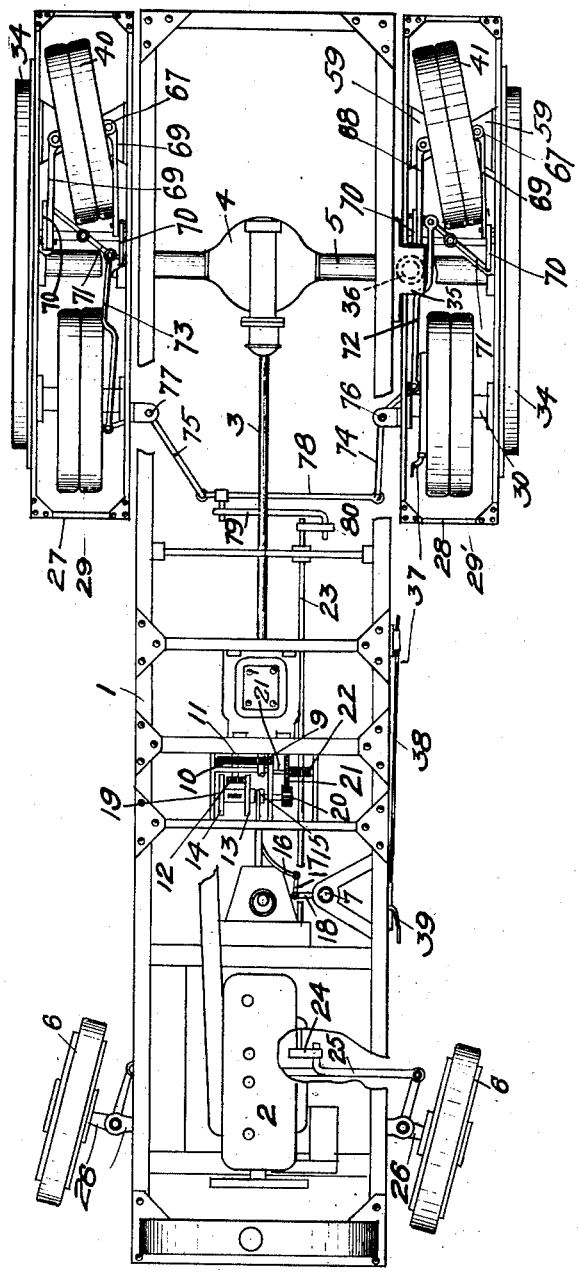
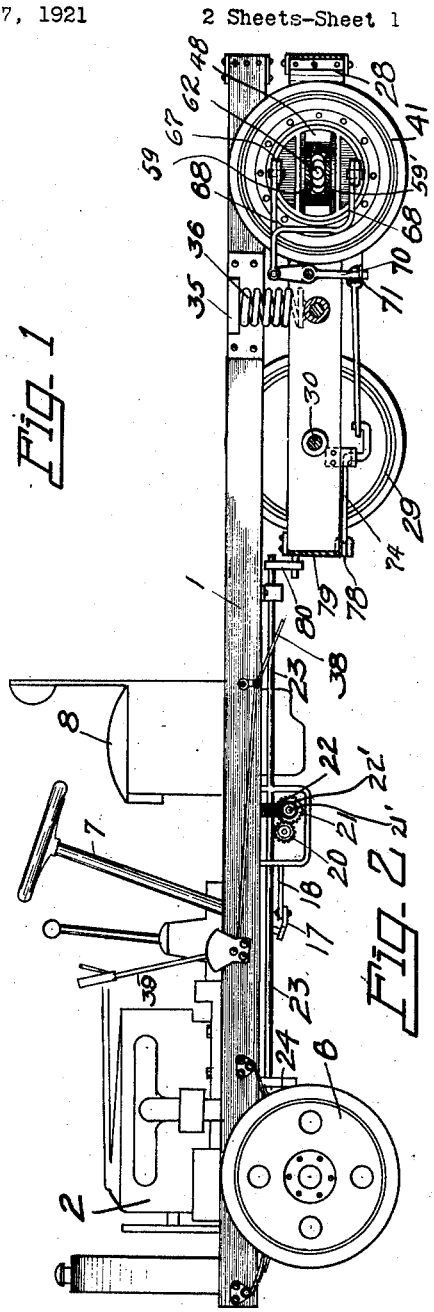
Inventor
Lawrence F. Jordan.
By Herbert E. Smith
Attorney

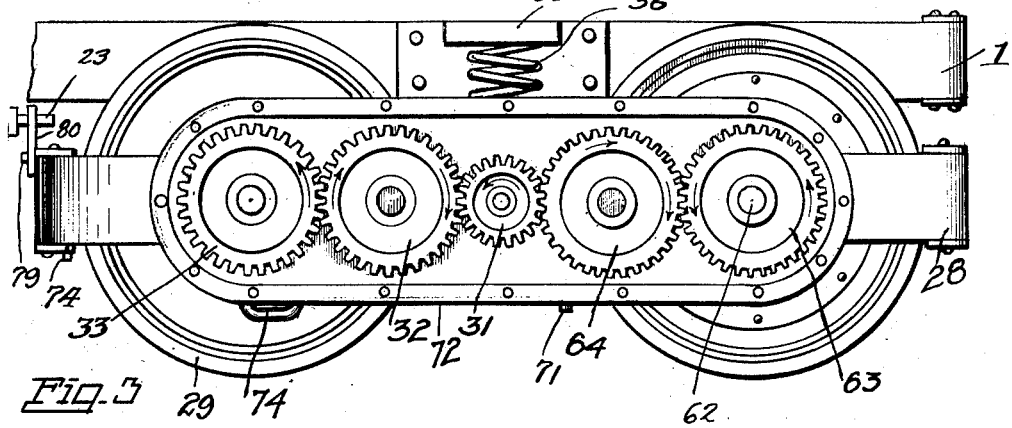
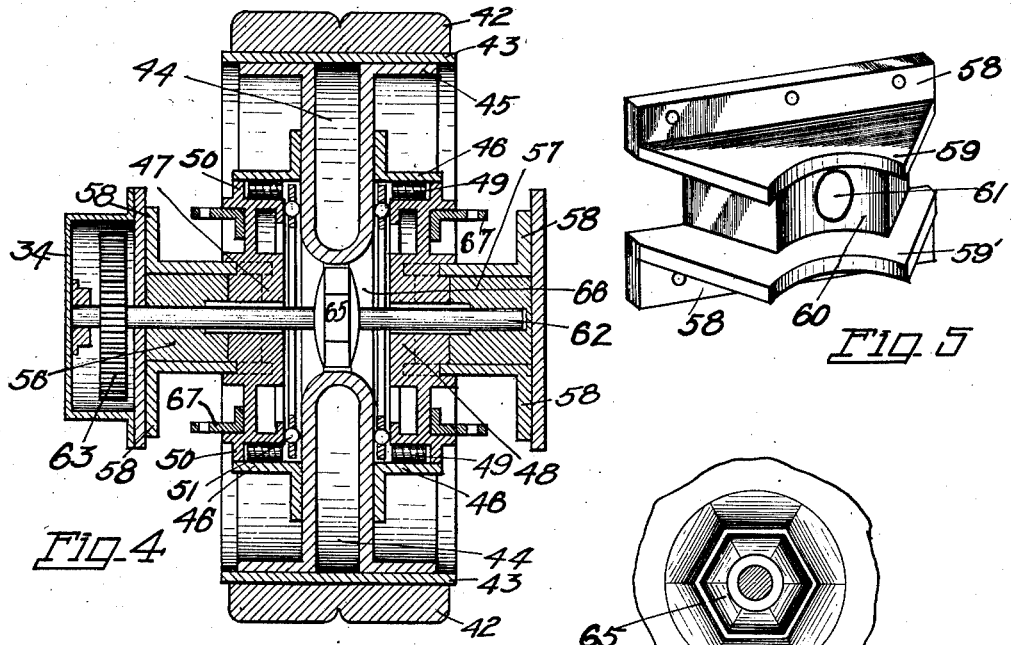
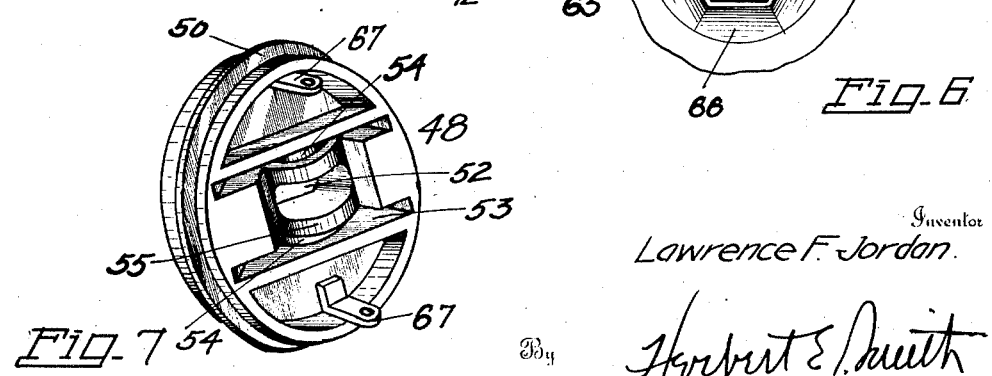

Patented June 16, 1925.

1,541,965

UNITED STATES PATENT OFFICE.

LAWRENCE F. JORDAN, OF DEER PARK, WASHINGTON.

MOTOR VEHICLE.

Application filed June 7, 1921. Serial No. 475,813.

*To all whom it may concern:*

Be it known that I, LAWRENCE F. JORDAN, a citizen of the United States, residing at Deer Park, in the county of Spokane and State of Washington, have invented certain new and useful Improvements in Motor Vehicles, of which the following is a specification.

My present invention relates to improvements in Motor Vehicles of the six wheel type having two front steering wheels on stub axles, and two sets of tandem wheels at the rear of the vehicle, which sets are driven from the motor of the vehicle. The trailer wheels of the rear sets are also adapted as steering wheels, and are operated from the motor of the vehicle for making short and convenient turns. This arrangement of wheels renders the vehicle especially adaptable for hauling of carrying heavy loads and provides for a flexibility in steering the vehicle to relieve the latter of strains and stresses, and to relieve or reduce the wear upon the roadway from the wheels when the vehicle is making a turn.

The invention contemplates a motor vehicle of the six wheel type provided with the usual stub-axle front steering wheels, and rear side frames pivoted or vertically oscillatible on the rear driving axle of the vehicle, and the invention consists in various combinations and arrangements of parts, and certain novel features of construction as will be hereinafter more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a plan view of a motor vehicle constructed according to and embodying the subject matter of my invention, parts being omitted.

Figure 2 is a view in side elevation of the vehicle, parts being shown as broken away for convenience of illustration.

Figure 3 is an enlarged detail side elevation of one of the rear side frames, partly in section disclosing the transmission gearing for driving the rear wheels and connecting parts.

Figure 4 is an enlarged, vertical sectional view through one of the rear steering-driving wheels and frame.

Figure 5 is a view in perspective of one of the bearing blocks of which there are two at the sides of the steering-driving wheels.

Figure 6 is a detail view showing the relation of the driving head and socket, of the steering-driving wheels.

Figure 7 is a detail perspective view of one of the pair of hub sections to each steering-driving wheel which is complementary to the bearing block of Figure 5.

To illustrate the physical application of my invention I have utilized a well known form of motor vehicle of the truck type having the rectangular frame or chasis 1 constructed and braced in usual or suitable manner, and the motor 2 at the front of the vehicle supplies the power for operating the steering mechanism, in addition to rotating the longitudinally extending driving shaft 3. Power is transmitted through the differential mechanism in casing 4 to the rear driving axle 5 in usual manner.

At the front of the vehicle I utilize the customary steering wheel 6, 6 that are power operated through manipulation of the steering post 7 from the driver in the seat 8. From the propelling shaft 3 the steering wheels 6 are turned through the connecting pinion 9 on said shaft, a gear 10 on the counter shaft 11, and a friction wheel 12 on the shaft 11. The friction wheel may engage either of the two friction disks 13 or 14, the disks being shifted by means of a usual clutch collar 15, having operative connections including lever 16, link 17, and an arm 18 on the steering post. The clutch shaft 19 may be rotated in clockwise or anti-clockwise direction by proper manipulating of the clutch device for turning the vehicle in desired direction, and a gear wheel 20 on this shaft meshing with a gear wheel 21 on shaft 21', turns the wheel 22'. A worm wheel 22 on the steering crank shaft 23 is revolved from gear 22' on the shaft 21'. This shaft 23 extends longitudinally of the vehicle, parallel with the propelling shaft 3, and at its forward end has a crank arm 24 connected to the steering rod 25 extending transversely of the vehicle which is connected in usual manner to the stub axles 26 of the wheels 6 for turning the latter. In this manner and by these connections the front steering wheels are turned by mechanism operated from the motor through the propelling shaft and under control of the driver who manipulates the steering wheel and post as usual.

The rear steering wheels are also power operated from the steering crank shaft 23 as will be later described.

At the rear of the vehicle are a pair of side frames 27 and 28 of strong and durable construction, and approximately rectangular in shape, which are oscillatable on the ends of the driving axle 5 to add flexibility to the traveling vehicle. A pair of co-axial driving wheels 29 are disposed at the front of the side frames and journaled on shafts 30 having fixed bearings in the side frames in front of the driving axle 5. These wheels are driven from the rear axle through a train of gears comprising the main gear 31 on the ends of the axle, which project through the side frames, an intermediate gear 32, and a driven gear 33 on the wheel shafts 30, a gear casing 34 of usual type being employed to enclose and shield the gears.

The vehicle frame, at the rear end is supported above these side frames by means of pedestal plates 35 located directly above the rear axle, and beneath these plates are strong coiled springs 36 having a suitable bearing on the upper portion of the axle casing to absorb shocks and vibrations. One of these pedestal plates and its spring are located at each side of the vehicle frame to support the latter above the rear axle.

One or more brake devices as indicated at 37 may be utilized in connection with the wheels 29 which are operated from the brake lever 38 and connecting rod 39 by the driver of the vehicle.

Within each side frame are a pair of tandem wheels, positively driven, and the trailers 40 and 41 of the tandems are also steering wheels and may be turned in a horizontal plane, as well as rotated or revolved for propelling the vehicle.

Inasmuch as the construction and operation of these wheels 40 41 are similar, the description and illustration of one will suffice for both, and attention is therefore called to figures 4, 5, 6, and 7 for details of construction of these wheels. Each wheel is provided with a usual cushion tread 42 on the metal rim 43, and the wheel, which is of the disk type has a central circular web 44 with double walls, and opposed, outwardly extending horizontal flanges 45 riveted or bolted to the rim 43. At each side of the double-wall disk 44 are attached flanged hub rings 46 of suitable width, and within these rings are complementary hub sections 47, 48 between the periphery of which and the hub rings are roller bearings 49 to take the load on the wheels and facilitate the rotation of the wheels about the hub sections 47 48. On the exterior of each hub section is a vertically extending, integral, annular flange 50 for retaining the roller bearings 49, and at the inner faces of these hub sections, and between said sections and the double wall disk are ball bearings 51 to take lateral thrust or strains between the revolving wheel and the stationary or non-revolving hub sections.

As seen in Figures 4 and 7 each hub section is provided with a central, horizontal slot 52 extending therethrough, and about this slot is arranged in horizontal position an H-shape slot 53. At the upper and lower portions of the H-shaped slot are fashioned convex bearing faces 54 disposed horizontally and between these two faces is fashioned a vertically extending curved convex face 55. In conjunction with the two hub sections I employ complementary bearing blocks 56 and 57, one of which is illustrated in detail in Figure 5, provided with perforated flanges 58 that are bolted or otherwise secured to the inner faces of the bars or plates of the side frames 27 and 28. Each of these blocks has two horizontal, concave bearing webs 59 59' to fit into the upper and lower parts of the H-shape slot and engage the convex faces 54 thereof, and each block has a vertically extending concave bearing face 60 to co-act with the convex face 55 of the hub section. Each block is provided with a bore or opening 61 co-axial with the slots 52 of the hub sections and through these alined bores and slots the shaft 62 extends, transversely of the side frames.

The bearing blocks form journal bearings for the shaft 62, which at its outer end projecting into the gear casing 34 has thereon a gear 63 driven from the main gear 31 through the intermediate gear 64.

Power is transmitted through the shaft 62 to the disk wheel by means of a hexagonal or other polygonal head 65 rigidly fixed on the shaft, which engages in a socket 66 conforming thereto in the disk wheel. The connection between said head and socket is such that the wheel will be revolved from the shaft through the head, and a slight space between the head and the socket of the wheel permits a limited horizontal oscillation on the head for steering. The slots 52 in the hub sections permit these sections to oscillate with the wheel, and the bearing faces on the pairs of hub sections and bearing blocks, which faces are struck from the center of the driving head 65, permit oscillation of the wheel without lost motion.

The steering-driving wheels are oscillated or turned for steering through the steering lugs 67 on the hub sections, an upper and a lower one forming a pair on each section. To these lugs are attached or pivoted pairs of links 68, 69, two links at the outer side of each wheel and two links at the inner side of each wheel, within the side frames, and the pairs of links are connected each to a vertically disposed rocking lever 70 pivoted within the frame, forward of and at the sides of the wheels. At their lower ends these vertical rocking levers are pivoted to a common horizontal rocking lever 71, and to the horizontal rocking levers are pivoted the bent rods 72 and 73 respectively. These bent rods which extend forward and longitudinally of the side frames are pivoted to lever arms 74 and 75, which are pivoted respectively at 76 and 77 in the side frames, and the lever arms are also pivotally connected with the transverse bar 78, suitable connections being provided at the joints to permit required movement of these links, bars and rods, when the transverse bar 78 is moved through the crank rod 79 and crank arm 80, the latter on the rear end of the steering crank rod 23, Through the above described connections in which loose pivots and necessary lost motion are provided it will be apparent that both the front steering wheels and the rear steering-driving wheels may be turned as indicated in Figure 1, to guide the vehicle to the right or left and make the required turn, the steering mechanism being under control of the driver and operated from the motor 2.

Having thus fully described my invention, what I claim as new and desire to secure by Letters Patent is—

1. The combination with a motor vehicle frame and its driving axle, of a pair of rectangular side frames on said axle and means for supporting the vehicle frames from said axle, of a pair of driving wheels arranged in tandem form and journaled within said rectangular frames, the rear wheels only in said frames being movable for steering, and means for moving said steering wheels.

2. A motor vehicle having a driving axle and a side frame oscillatible thereon, a front drive wheel journaled in said frame, a rear steering wheel having an open center disk and lateral fixed hub rings, bearing blocks fixed in the side frame, a pair of slotted hub sections interposed between said disk and said blocks, anti-friction bearings between said rings and hub sections, a wheel shaft journaled in the blocks and passing through said hub sections, and means for oscillating said hub sections.

3. A driving wheel having an open center disk and lateral fixed hub rings, a frame and spaced bearing blocks therein, oscillatible, slotted hub sections interposed between the disk and each block, anti-friction bearings between said rings and hub sections, a shaft journaled in said blocks and passing through said hub sections, operative connections between said shaft and disk, means for operating the shaft, and means for oscillating said hub sections.

4. The combination with a frame and fixed bearing blocks having concave bearing webs and concave bearing faces, of a disk wheel having fixed hub rings, slotted hub sections supported in said blocks, anti-friction bearings between said wheel and sections and anti-friction bearings between said rings and sections, said sections having horizontally disposed H-shaped slots and convex bearing elements complementary to said webs and faces, a drive shaft journaled in the blocks and passed through said slots in the sections, and a driving head on said shaft engaging the disk wheel.

5. The combination with a wheel having a central polygonal opening, a frame and fixed bearing blocks in the frame, of slotted hub sections between the wheel and blocks, a shaft journaled in said blocks and passed through slots in said sections, and a head on said shaft located in said opening.

6. The combination with fixed bearing blocks, of a wheel having a disk with a central opening, slotted hub sections and anti-friction bearings between said disk and sections, hub rings on the disk and anti-friction bearings between said rings and sections, said sections and blocks having adjoining circular bearing faces, a shaft journaled in the blocks and passed through slots in the sections, and a driving head on said shaft engaging the walls of the disk opening.

In testimony whereof I affix my signature,

LAWRENCE F. JORDAN.